US007558549B2

(12) United States Patent
Nhu

(10) Patent No.: US 7,558,549 B2
(45) Date of Patent: Jul. 7, 2009

(54) METHOD AND SYSTEM FOR REJECTING SINGLE-SIDED LEAKAGE INTO AN AMPLITUDE MODULATED (AM) CHANNEL

(75) Inventor: Hoang Huy Nhu, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 697 days.

(21) Appl. No.: 10/884,646

(22) Filed: Jul. 2, 2004

(65) Prior Publication Data

US 2005/0186926 A1    Aug. 25, 2005

Related U.S. Application Data

(60) Provisional application No. 60/543,369, filed on Feb. 9, 2004.

(51) Int. Cl.
    *H04B 1/68*    (2006.01)
(52) U.S. Cl. .................... 455/203; 455/63.1; 455/142; 455/210; 455/278.1; 455/309; 381/11; 381/15; 348/738; 348/485
(58) Field of Classification Search ................. 455/296, 455/179.1, 180.2, 188.1, 203, 210, 278.1, 455/304, 307, 309, 183.1, 63.1, 67.11, 67.13, 455/260, 339; 342/159, 93; 375/320, 321, 375/322, 324, 327, 346; 381/11–15; 348/738, 348/484, 485, 607
See application file for complete search history.

(56) References Cited

U.S. PATENT DOCUMENTS 4,293,856 A * 10/1981 Chressanthis et al. ......... 342/93

| | | | | |
|---|---|---|---|---|
| 4,302,626 A * | 11/1981 | Streeter | ......................... | 381/15 |
| 4,356,510 A * | 10/1982 | Nakayama | ................... | 348/484 |
| 4,410,762 A * | 10/1983 | Ecklund | ....................... | 381/15 |
| 4,466,116 A * | 8/1984 | Streeter | ......................... | 381/15 |
| 4,761,814 A * | 8/1988 | Sugai et al. | ................... | 381/13 |
| 4,999,589 A * | 3/1991 | DaSilva | ................... | 331/117 R |
| 5,419,194 A * | 5/1995 | Varnham et al. | .......... | 73/504.13 |
| 5,446,500 A * | 8/1995 | Harford | ....................... | 348/618 |
| 5,940,025 A * | 8/1999 | Koehnke et al. | ............ | 342/159 |
| 6,978,125 B2 * | 12/2005 | Lindell et al. | ............ | 455/183.1 |
| 7,136,431 B2 * | 11/2006 | Shi et al. | ..................... | 375/319 |
| 7,161,613 B2 * | 1/2007 | Liu et al. | ....................... | 348/21 |
| 7,200,193 B2 * | 4/2007 | Poklemba et al. | ........... | 375/343 |

FOREIGN PATENT DOCUMENTS

| JP | 02101886 A | * | 4/1990 |
|---|---|---|---|
| JP | 05235647 A | * | 9/1993 |

* cited by examiner

*Primary Examiner*—Edward Urban
*Assistant Examiner*—Junpeng Chen
(74) *Attorney, Agent, or Firm*—McAndrews, Held & Malloy, Ltd.

(57) ABSTRACT

Aspects of the method and system for rejecting single sided leakage into an amplitude modulated channel may comprise an AM demodulator for demodulating a received composite broadcast signal's control channel to generate an amplitude modulated (AM) component. A PM demodulator may demodulate a received composite broadcast signal's control channel to generate a phase modulated (PM) component. At least one subtractor may subtract an AM leakage component and a PM leakage component contributed by the single sided leakage in the received composite broadcast signal's control channel. The system may comprise at least one of each of AM and PM bandpass filters and envelope detectors that filter and detect envelopes of the AM and PM components at 982.5 Hz and 922.5 Hz.

29 Claims, 8 Drawing Sheets

METHOD AND SYSTEM FOR REJECTING SINGLE-SIDED LEAKAGE INTO AN AMPLITUDE MODULATED (AM) CHANNEL

CROSS-REFERENCE TO RELATED APPLICATIONS/INCORPORATION BY REFERENCE

This application makes reference to, claims priority to, and claims the benefit of U.S. Provisional Application Ser. No. 60/543,369 filed Feb. 9, 2004.

The above stated application is hereby incorporated herein by reference in its entirety.

FIELD OF THE INVENTION

Certain embodiments of the invention relate to processing of TV broadcast audio signals. More specifically, certain embodiments of the invention relate to a method and system for rejecting single-sided leakage into amplitude-modulated (AM) channel.

BACKGROUND OF THE INVENTION

The composite spectrum of Japanese stereo TV broadcast audio comprises three channels, each of which occupies a distinct frequency band. The three channels are the MAIN, SUB, and CONTROL channels, which are also referred to as the monaural, stereo and control channels. The control channel is amplitude modulated (AM) and contains information that is utilized to inform a receiver whether the broadcast is in monaural, stereo or dual mono mode. When the AM carrier is absent, the broadcast is in mono, and when the AM carrier is present, the AM sidebands frequency will be at either 982.5 Hz or 922.5 Hz for stereo and dual mono broadcast, respectively The SUB channel is a frequency modulated (FM) channel, and the MAIN channel is not modulated. Depending on a frequency and amplitude of an input audio signal, the SUB channel may have sidebands frequency contents that leak into the adjacent AM control channel. The leakage into the adjacent AM control channel is typically in the form of a single-sided peak of amplitude A, which may be mathematically decomposed into two double-sided pairs, each having an amplitude A/2. One of the double-sided pairs AM and the other double-sided pair is phase modulated (PM).

A clean control channel, one without leakage, would have AM sidebands at 922.5 Hz on both sides of the center carrier frequency if the broadcast is in dual mono mode, or at 982.5 Hz on both sides of the center carrier frequency if the broadcast is in stereo mode. A decoder comprising a phase-locked loop (PLL) may lock onto the AM carrier, and an AM demodulator is utilized to recover the AM sideband at a frequency of either 922.5 Hz or 982.5 Hz. In cases where there is no leakage, after band pass filtering, the resulting two envelopes at these two frequencies may be compared with each other. As a result of this comparison, a decoder may be able to discriminate between broadcast stereo mode and dual-mono mode. However, when leakage from the SUB channel is sufficiently large or non-negligible, and is also at the incorrect frequency of either 982.5 Hz or 922.5 Hz around the AM carrier, the leakage contributes an AM component of amplitude A/2 that is present at the output of the AM demodulator. As a result of this leakage, the decoder might incorrectly decode the actual broadcast mode. For example, if a broadcast is in stereo mode, then a receiver may incorrectly mis-detect it as a dual-mono mode. Similarly, if the broadcast is in dual-mono mode, then a receiver may incorrectly mis-detect it as stereo mode. Additionally, in certain border instances, the receiver may be unable to determine whether the broadcast is in stereo mode or dual-mono mode and may keep switching back and forth between the two modes.

FIG. 1a is a graph illustrating the spectrum 100 of a Japanese TV broadcast audio signal with the second FM sideband leaking into the control channel. Referring to FIG. 1a, there is shown a frequency modulated (FM) channel 102 and an amplitude modulated (AM) control channel 104 of the spectrum 100.

FIG. 1b is a more detailed graph illustrating a zoomed portion of the AM control channel for the spectrum of FIG. 1a for DualMono. Referring to FIG. 1b, there is illustrated an AM carrier 110 located at 3.5 fH Hz, where fH is the horizontal frequency at 15,734 Hz. To the right of the AM carrier 110 is an upper AM sideband signal 112a and to the left of the AM carrier 110 is a lower AM sideband signal 112b. In the case of a dual-mono signal as shown here in FIG. 1b, the upper AM sideband signal 112a is located at 922.5 Hz above the AM carrier 110, and the lower AM sideband signal 112b is located at 922.5 Hz below the AM carrier 110. In the case of a stereo signal, the upper AM sideband signal 112a is located at 982.5 Hz above the AM carrier 110, and the lower AM sideband signal 112b is located at 982.5 Hz below the AM carrier 110. FIG. 1b also illustrates a leakage signal 114 that has leaked into the AM channel. In this regard, the leakage signal 114, is a single sideband signal, which is located at 982.5 Hz below the AM carrier 110.

In operation, for example, during dual-mono mode, the leakage signal 114, which is located at 982.5 Hz is located at the same frequency as would a stereo AM sideband signal. Accordingly, this could cause a receiver to mis-detect the dual-mono broadcast mode, and incorrectly characterize it as a stereo mode.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for rejecting single sided leakage into an amplitude modulated (AM) channel. Aspects of the method may comprise demodulating a received composite broadcast signal's control channel containing single sided leakage, to generate an amplitude modulated (AM) component and a phase modulated (PM) component. An AM leakage component and a PM leakage component contributed by the single sided leakage may be subtracted from the AM component and the PM component, the AM leakage component and the PM leakage component contributed by the single sided leakage in the received composite broadcast signal's control channel. An AM demodulator may be utilized to demodulate the received composite broadcast signal's control channel to generate the AM component. A PM demodulator may be utilized to demodulate the received composite broadcast signal's control channel to generate the PM component.

The method may further comprise bandpass filtering and detecting envelopes of the AM component at 982.5 Hz and 922.5 Hz, and bandpass filtering and detecting envelopes of the PM component at 982.5 Hz and 922.5 Hz. The method may also comprise locking onto a carrier of the AM channel prior to demodulating the received composite broadcast signal's control channel. The received composite broadcast signal's control channel may be band pass filtered prior to being AM demodulated and PM demodulated. It may also be determined whether the received composite broadcast signal is in monaural (mono) mode by detecting the absence of the AM carrier.

Another embodiment of the invention may provide a computer-readable medium, having stored thereon, a computer program having at least one code section executable by a computer, thereby causing the computer to perform the steps described above for rejecting single sided leakage into an amplitude modulated channel.

Aspects of the system may comprise an AM demodulator that AM demodulates a received composite broadcast signal's control channel to generate an amplitude modulated (AM) component. A PM demodulator may PM demodulate the received composite broadcast signal's control channel to generate a phase modulated (PM) component. At least one circuit is utilized to remove an AM leakage component and a PM leakage component contributed by the single sided leakage in the received composite broadcast signal's control channel. The at least one circuit that is utilized to remove the AM leakage component and the PM leakage component contributed by the single sided leakage in the received composite broadcast signal's control channel is a subtractor.

The system may comprise at least one AM band pass filter and envelope detector that filters and detects envelopes of the AM component at 982.5 Hz and 922.5 Hz and at least one PM bandpass filter and envelope detector that filters and detects envelopes of the PM component at 982.5 Hz and 922.5 Hz. At least one phase lock loop (PLL) is used to lock onto a carrier of the AM channel prior to the demodulation of the received composite broadcast signal's control channel. At least one band pass filter may be adapted to band pass filter the received composite broadcast signal's control channel. Mode decision circuitry may be configured to determine whether the demodulated received composite broadcast signal is stereo or dual-mono or mono.

These and other advantages, aspects and novel features of the present invention, as well as details of an illustrated embodiment thereof, will be more fully understood from the following description and drawings.

DETAILED DESCRIPTION OF THE INVENTION

In accordance with an embodiment of the invention, the misdetection characteristic of conventional receivers may be avoided by utilizing a PM demodulator in parallel with the AM demodulator. Bandpass filters (BPFs) and envelope detectors may also be added for the PM demodulation path. These bandpass filters (BPFs) and envelope detectors are similar to those bandpass filters (BPFs) and envelope detectors that may be utilized in the AM path. Without the leakage, it is sufficient to feed the two envelope detectors' outputs (in the AM path) at 922.5 Hz and 982.5 Hz to a decision circuit for comparison and mode detection. However, with the leakage present, in order to cancel the effect of the single-sided leakage, an absolute difference circuitry may be configured to determine absolute differences between the AM and PM envelopes at the two frequencies 982.5 and 922.5 Hz. Accordingly, the resulting two corresponding absolute differences may then be compared and processed. The absolute difference circuit may be adapted to cancel the two equal AM and PM components of the one-sided sideband leakage while leaving the true AM sidebands intact.

Figure 2A:
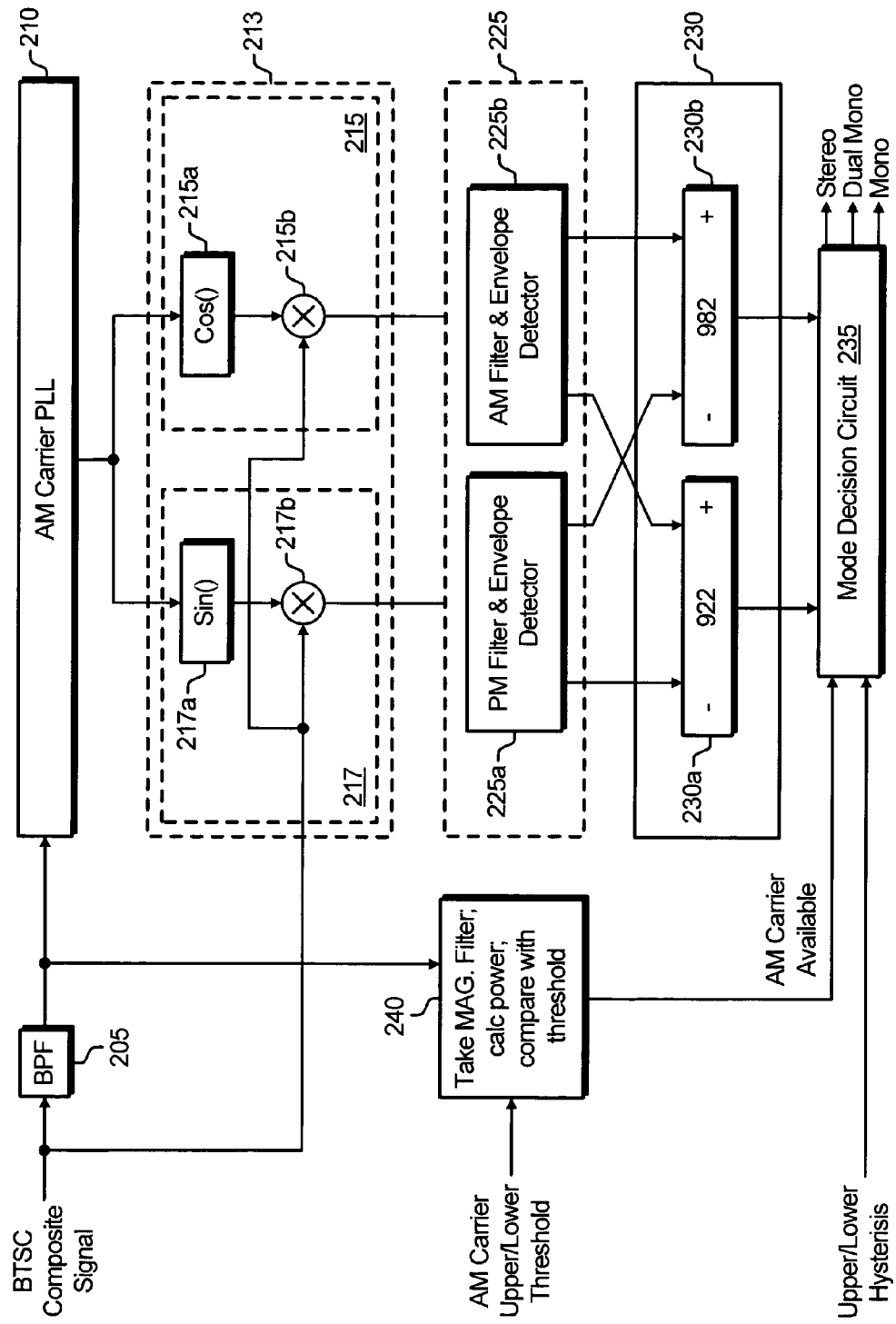
FIG. 2a is a block diagram of an exemplary decoder that may be adapted to reject single-sided leakage into an amplitude-modulated (AM) channel, in accordance with an embodiment of the present invention.

FIG. 2a is a block diagram of an exemplary decoder that may be adapted to reject single-sided leakage into an amplitude-modulated (AM) channel, in accordance with an embodiment of the present invention. Referring to FIG. 2a, there is shown band pass filter block 205, AM carrier phase lock loop (PLL) block 210, demodulator block 213, filter and envelope detector block 225, subtractor block 230, and mode decision block 235.

The band pass filter block 205 may comprise suitable logic circuitry and/or code that may be adapted to receive and bandpass filter a received BTSC composite signal. The band pass filter block 205 may be centered around 3.5 fH.

Figure 2B:
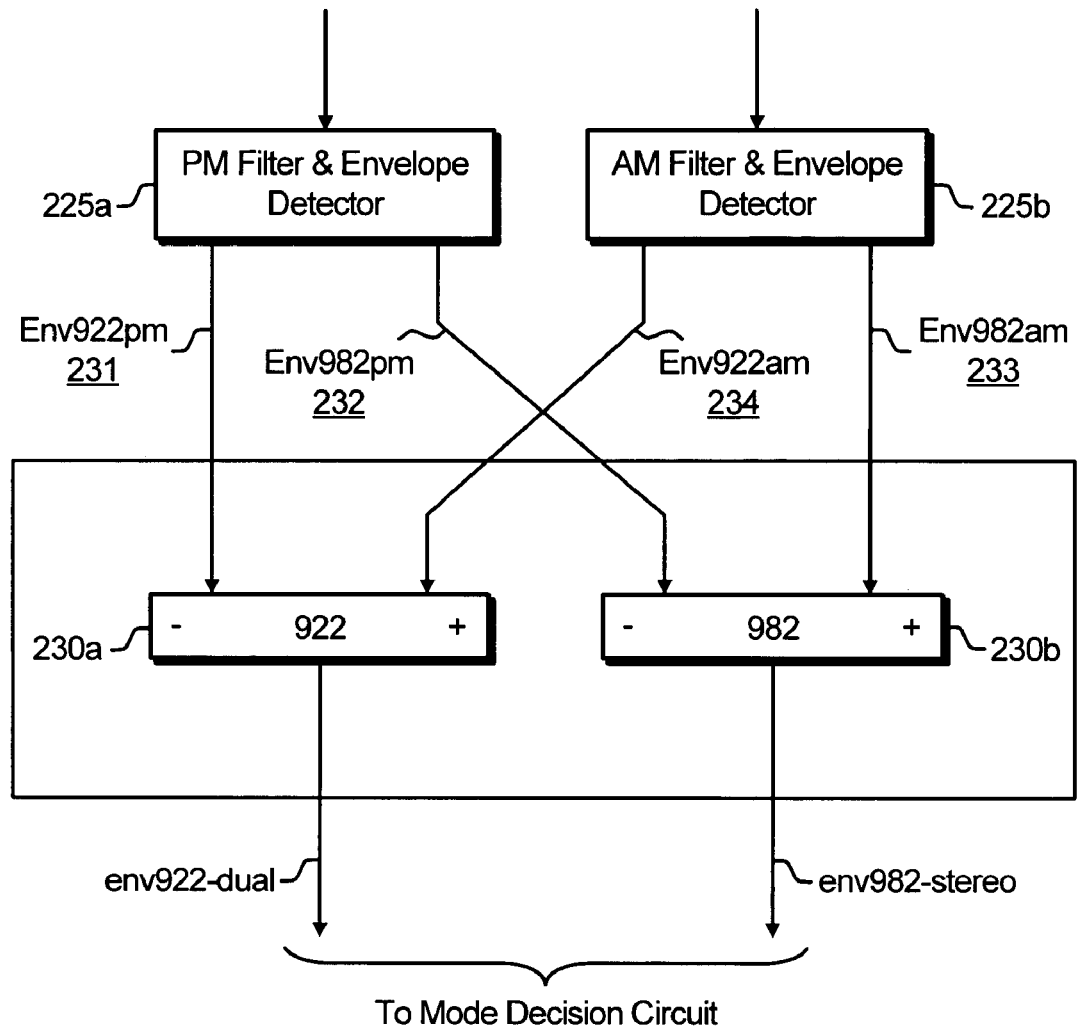
FIG. 2b is a block diagram illustrating the operation of the subtractor blocks of FIG. 2a in accordance with an embodiment of the invention.
Figure 2C:
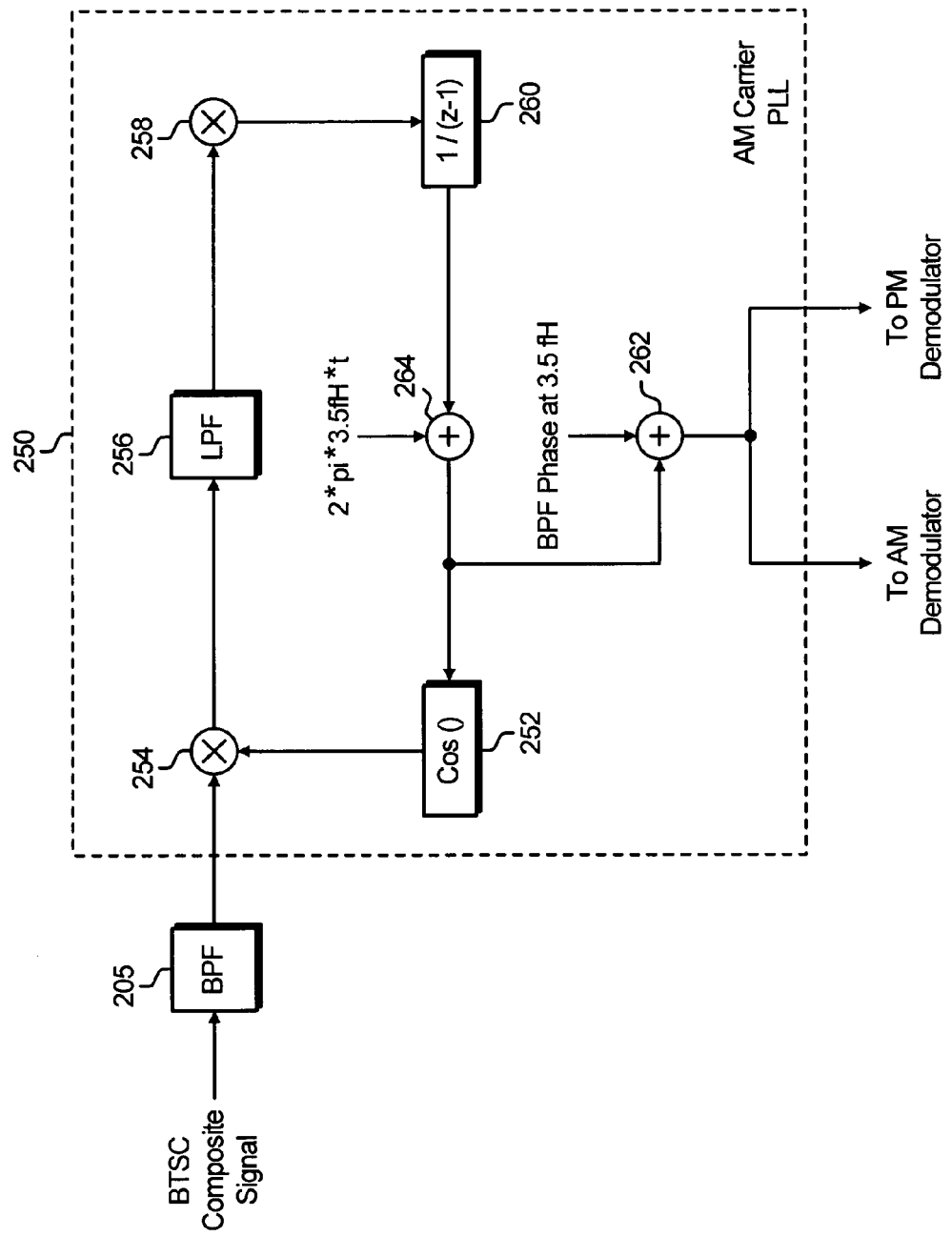
FIG. 2c is a block diagram of an exemplary PLL that may be utilized as the PLL block of FIG. 2a in accordance with an embodiment of the invention.

The AM carrier phase lock loop (PLL) block 210 may comprise suitable logic circuitry and/or code that may be adapted to lock onto the AM carrier at 3.5 fH. FIG. 2c is a block diagram of an exemplary PLL 250 that may be utilized as the PLL block 210 of FIG. 2a in accordance with an embodiment of the invention. Referring to FIG. 2c, there is shown a cosine function block 252, a multiplication block 254, a low pass filter (LPF) block 256, gain block 258, integrator block 260, and summation blocks 262 and 264. The cosine function block 252 and the multiplication block 254 functions as a phase detector. The resulting AM modulated signal is low pass filtered by the LPF block 256. The gain block 258 may adjust a gain of the resulting low pass filtered signal and the integrator block 260 integrates the resulting gain adjusted signal. The summers 262 and 264 are adapted to adjust to or lock onto the AM carrier frequency at 3.5 fH.

The demodulator block 213 of FIG. 2a may comprise AM demodulator block 215 and PM demodulator block 217. The AM demodulator block 215 may comprise cosine function block 215a and multiplier block 215b. The PM demodulator block 217 may comprise sine function block 217a and multiplier block 217b.

The filter and envelope detector block 225 of FIG. 2a may comprise PM filter and envelope detector block 225a and AM filter and envelope detector block 225b. Each of the PM filter and envelope detector block 225a and AM filter and the envelope detector block 225b may comprise suitable logic, circuitry and/or code that may be adapted to low pass filter the PM and AM demodulated signals received from the PM demodulator block 217 and AM demodulator block 215, respectively. The two blocks 225a and 225b use band pass filters at center frequencies of 922.5 Hz and 982.5 Hz, respectively.

The subtractor block 230 may comprise subtractor block 230a and subtractor block 230b. Each of the subtractor blocks 230a and 230b may comprise suitable logic circuitry and/or code that may be adapted to determine an absolute difference of AM and PM demodulated components at the two frequencies of the broadcast signal. The subtractor block 230a may be adapted to handle a frequency of 922 Hz and the second subtractor block 230b may be adapted to handle a frequency of 982 Hz. Accordingly, the absolute difference of the envelopes that is determined may be utilized to cancel the two equal, undesired AM and PM components of the one-sided sideband leakage while leaving the true AM sidebands intact.

The mode decision block 235 receives outputs from blocks 240, 230a and 230b. Block 240 detects the absence of the AM carrier, which indicates Mono broadcast and passes that info onto block 235. When the AM carrier is present, block 235 will use info from 230a and 230b to distinguish between stereo and dual mono. In an aspect of the invention, upper or lower hysteresis may be utilized to accurately decide whether the broadcast is stereo or dual mono or mono; this avoids the decision block 235 to continuously switch between the three modes when there is an actual broadcast mode switch, which can be annoying to the listener. In accordance with another embodiment of the invention, a hysteresis of past detection conditions may also be utilized, by the mode decision circuit 235 to determine the broadcast mode.

In accordance with an embodiment of the invention, an output signal generated from the AM carrier PLL may be divided and processed by two separate processing paths. The first processing path may be referred to as a PM processing path and may comprise PM demodulation block 217, PM filter and envelope detector block 225a, and subtractor block 230. The second processing path may be referred to as an AM processing path and may comprise AM demodulation block 215, AM filter and envelope detector block 225b, and subtractor block 230.

In operation, the AM processing path and the PM processing paths may be utilized to decompose the received AM control channel into separate AM components and PM components. In an ideal case where there is no leakage into the AM control channel, if the broadcast channel is dual-mono (upper and lower sidebands at 922.5 Hz), for example, then the output of the band pass filter at 922.5 Hz will be larger than the 982.5 Hz band pass filter output FIG. 2b is a block diagram illustrating the operation of the subtractor blocks 230a and 230b in accordance with an embodiment of the invention. In addition to the references illustrated in FIG. 2a, FIG. 2b further illustrates a first output env922pm 231 and a second output env982pm 232 of the PM filter and envelope detector block 225a. FIG. 2b also illustrates a first output env982am 233 and a second output env922am 234 of the AM filter and envelope detector block 225b. Reference env922pm 231 represents the envelope of the PM 922.5 Hz bandpass filter in block 225a and reference env982pm 232 represents the envelope of the PM 982.5 hz bandpass filter in block 225a. Reference env982am 233 represents the envelope of the AM 982.5 hz bandpass filter in block 225b and reference env922am 234 represents the envelope of the AM 922.5 hz bandpass filter in block 225b.

With reference to FIG. 2b, when there is no leakage into the AM control channel and the broadcast channel is dual-mono (922.5 Hz), for example, then the output env922am 234 of the AM filter and envelope detector block 225b is large and the other output env982am 233 is negligible or zero. Also, the output env922pm 231 and output env982pm 232 of the PM filter and envelope detector block 225a are both negligible or zero. As a result, the output of the subtractor block 230a is large and predominantly due to the envelope env922am 234 since the contribution from the envelope env922pm 231 is negligible or zero. The output of subtractor block 230b is negligible or zero since the contributions from the envelopes env982pm 232 and env982am 233 are both negligible or zero. As a result, the mode decision circuit 235 of FIG. 2a will correctly detect the signal as a dual-mono signal.

In accordance with an embodiment of the invention, with reference to FIG. 2b, when there is single-sided leakage (at 982.5 Hz below the AM carrier), the leakage component will manifest itself as an AM component at one-half (½) the original amplitude of the leakage and as a PM component at one-half (½) the original amplitude of the leakage. Accordingly, for dual-mono broadcast mode, the output env922am 234 of the AM filter and envelope detector block 225b is large and the output env982am 233 of the AM filter and envelope detector block 225b is one-half (½) the original amplitude of the leakage. The output env922pm 231 of the PM filter and envelope detector block 225a is negligible or zero and the output env982pm 232 of the PM filter and envelope detector block 225a is one-half (½) the original amplitude of the leakage. As a result, the subtractor block 230b will subtract env982pm 232 from env982am 233, resulting in a cancellation of the leakage. Therefore, the output of the subtractor block 230b is negligible or zero. The output of the subtractor block 230a is predominantly due to the envelope env922am 234 since the contribution from the envelope env922pm 231 is negligible or zero. Therefore, the mode decision circuit 235 of FIG. 2a will correctly detect the signal as a dual-mono signal.

With reference to FIG. 2b, when there is no leakage into the AM control channel and the broadcast channel is stereo (982.5 Hz), then the output env982am 233 of the AM filter and envelope detector block 225b is large and the output env922am 234 of the AM filter and envelope detector block 225b is negligible or zero. Additionally, the output env982pm 232 and output env922pm 231 of the PM filter and envelope detector block 225a are both negligible or zero. As a result, the output of the subtractor block 230a is negligible or zero since the contributions from the envelopes env922pm 231 and env922am 234 are both negligible or zero. The output of the subtractor block 230b is predominantly due to the large envelope env982am 233 since the contribution from the envelope env982pm 232 is negligible or zero. As a result, the mode decision circuit 235 of FIG. 2a will correctly detect the signal as a stereo signal.

In accordance with an embodiment of the invention, with reference to FIG. 2b, when there is single-sided leakage at 922.5 Hz below the AM carrier, the leakage component will manifest itself as an AM component at one-half (½) the original amplitude of the leakage and as a PM component at one-half (½) the original amplitude of the leakage. Accordingly, for stereo broadcast, the output env982am 233 of the AM filter and envelope detector block 225b is large and the output env922am of the AM filter and envelope detector block 225b is one-half (½) the original amplitude of the leakage. The output env982pm 232 of the PM filter and envelope detector block 225a is negligible or zero and the output env922pm 231 of the PM filter and envelope detector block 225a is one-half (½) the original amplitude of the leakage. As a result, subtractor block 230a will subtract one-half (½) the original amplitude of the leakage contribution from env922pm 231 from one-half (½) the original amplitude of the leakage contribution from env922am 234, resulting in cancellation of the leakage. Therefore, the output of the subtractor block 230a is negligible or zero. The output of the subtractor block 230b is predominantly due to the large envelope env982am 233 since the contribution from the envelope env982pm 232 is negligible or zero. Therefore, the mode decision circuit 235 of FIG. 2a will correctly detect the signal as a stereo signal.

Figure 1A:
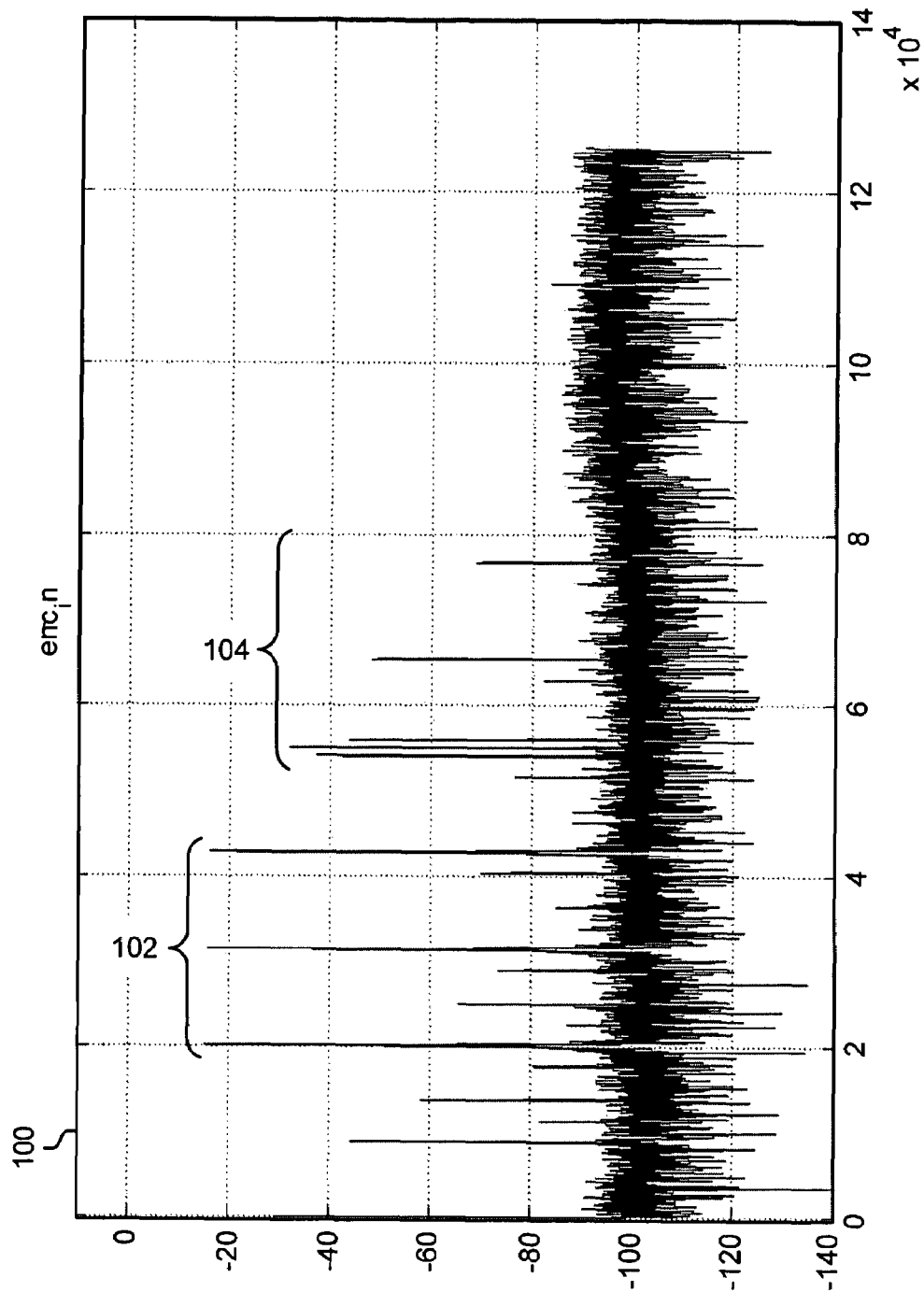
FIG. 1a is a graph illustrating the spectrum of a Japanese TV broadcast audio signal with the second FM sideband leaking into the control channel.
Figure 1B:
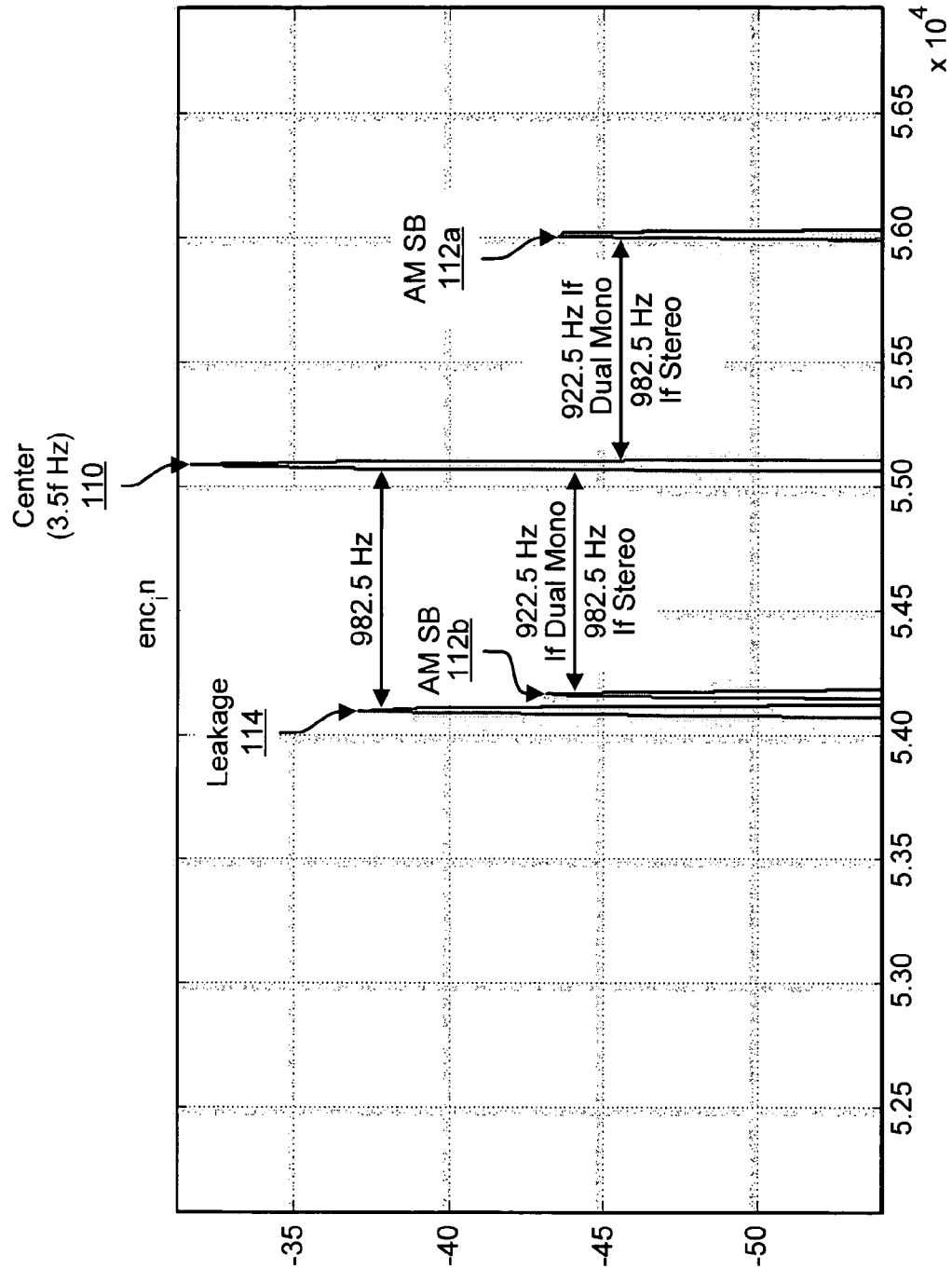
FIG. 1b is a more detailed graph illustrating a zoomed portion of the AM control channel for the spectrum of FIG. 1a for DualMono.
Figure 3:
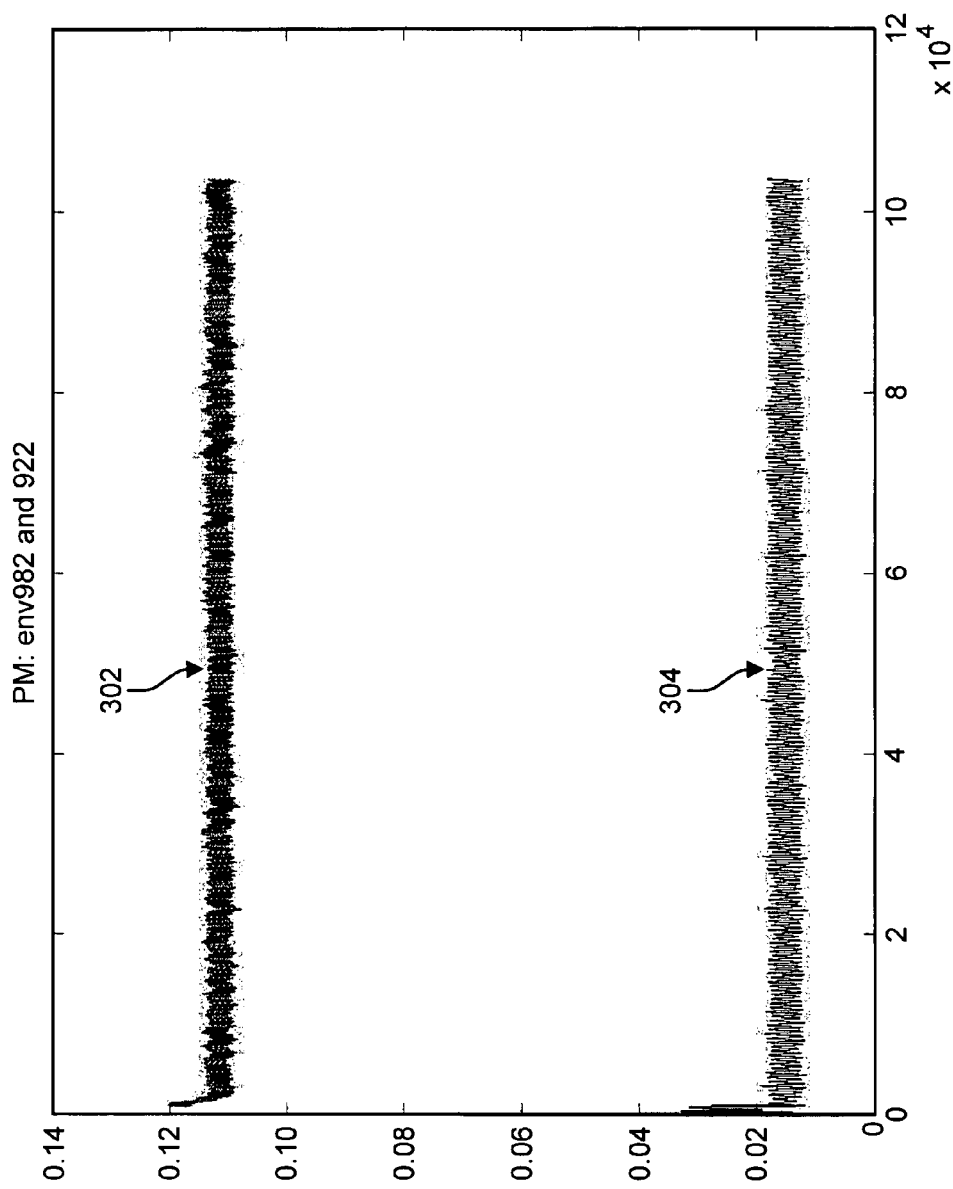
FIG. 3 illustrates the PM path's envelope detectors outputs at 922.5 Hz and 982.5 Hz for the dual-mono broadcast mode with single-sided leakage at 982.5 Hz below the AM carrier (as shown in FIG. 1b), in accordance with an embodiment of the invention.

FIG. 3 illustrates the PM path's envelope detectors outputs at 922.5 Hz and 982.5 Hz for the dual-mono broadcast mode with single-sided leakage at 982.5 Hz below the AM carrier (as shown in FIG. 1b), in accordance with an embodiment of the invention. Referring to FIG. 3, there is shown an envelope 302 and an envelope 304. Envelope 302 represents the output envelope env982pm 232 (FIG. 2b) resulting from the PM filter and envelope detector block 225a. This envelope 302 is derived from the PM component of the single-sided leakage and is one-half of the leakage's amplitude. Envelope 304 represents the output envelope env922pm 231 (FIG. 2b) resulting from the PM filter and envelope detector block 225a. Envelope 304 is small because there is no PM component at 922.5 Hz.

Figure 1C:
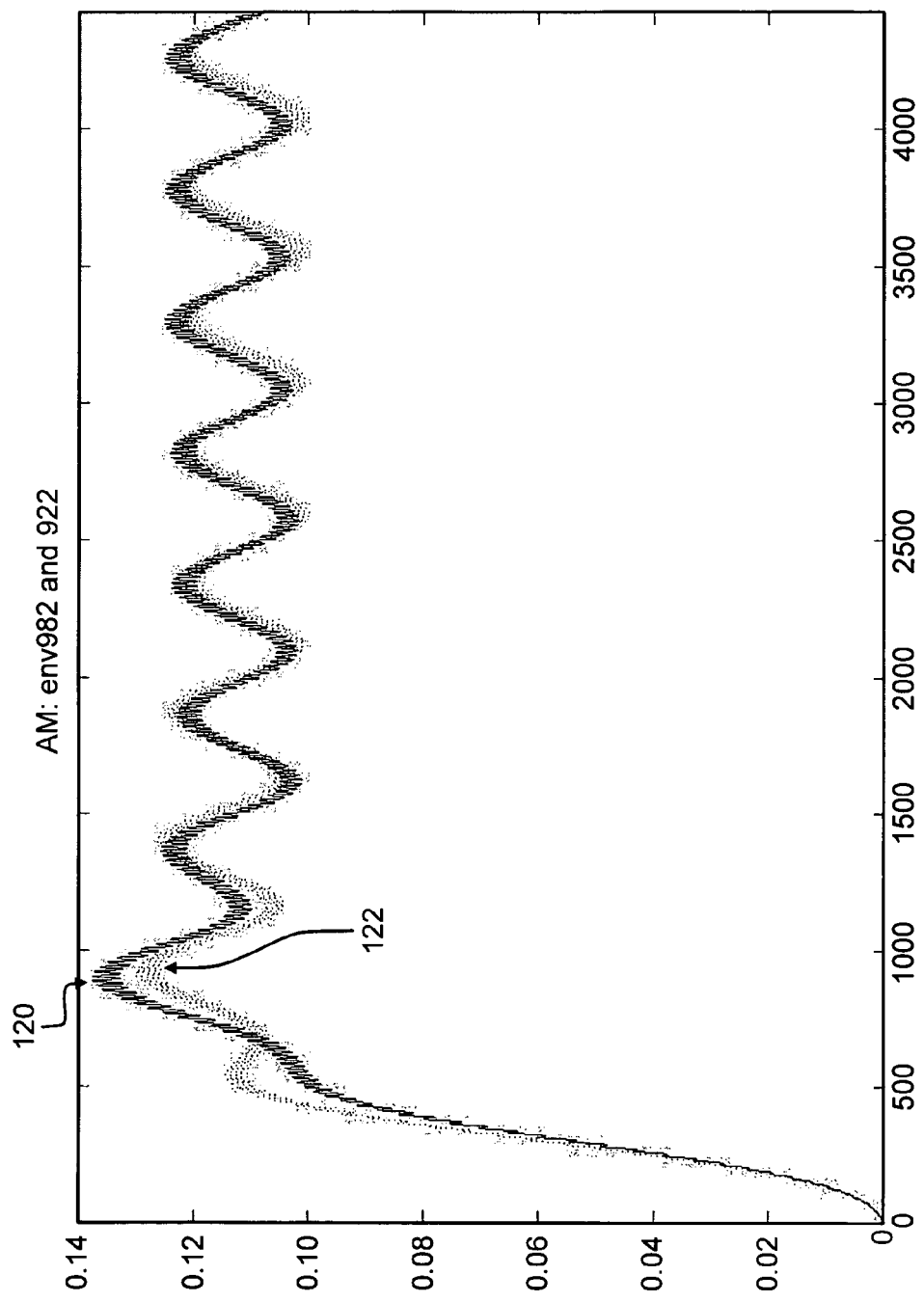
FIG. 1c is a graph illustrating the poor rejection of single-sided leakage into an amplitude modulated channel for dual-mono broadcast mode in a conventional system that utilizes only AM demodulation.

FIG. 1c is a graph illustrating the poor rejection of single-sided leakage into an amplitude modulated channel for dual-mono broadcast mode in a conventional system that utilizes only AM demodulation. This scenario is illustrated in FIG. 1b. Referring to FIG. 1c, there is shown an envelope 120 at 922.5 Hz (which is due to the AM sidebands in dual mono transmission) and an envelope 122 at 982.5 Hz (which is due to the single-sided leakage at 982.5 Hz below the AM carrier). Since the two envelopes at 982.5 Hz and 922.5 Hz are very close in amplitude, the decision block 235 cannot accurately decide whether the broadcast is in stereo mode and dual-mono mode. Comparing FIG. 1c to FIG. 4, it can be seen that AM and PM demodulators 215, 217 utilized in accordance with the various aspects of the invention, causes separation of the envelopes' amplitudes so that the broadcast mode may be correctly detected by the mode decision circuit 235 of FIG. 2a.

Figure 4:
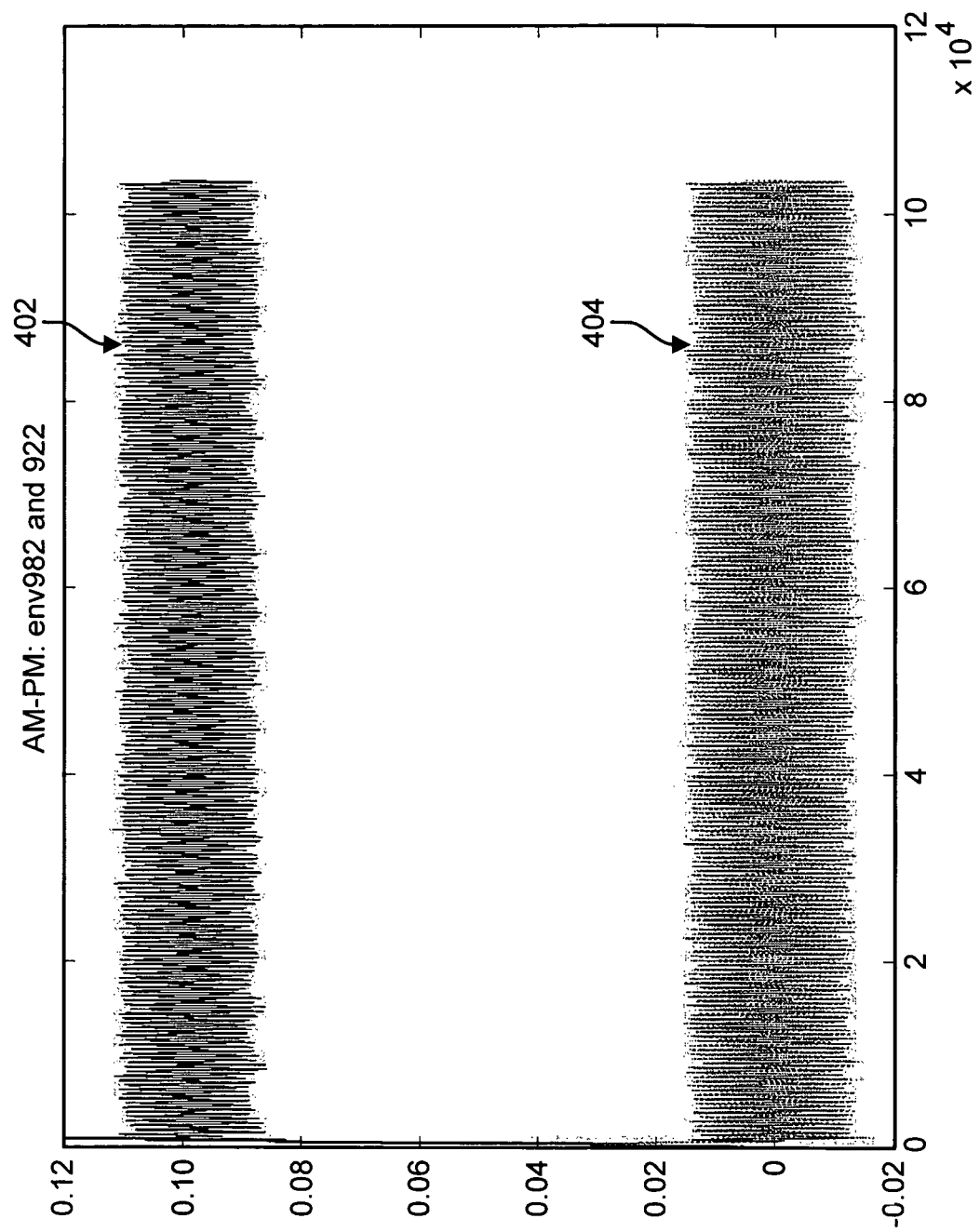
FIG. 4 is a graph illustrating good rejection of single-sided leakage into an amplitude modulated channel for a dual-mono broadcast mode after removing AM and PM leakage components, in accordance with an embodiment of the invention.

FIG. 4 is a graph illustrating good rejection of single-sided leakage into an amplitude modulated channel for a dual-mono broadcast mode after removing AM and PM leakage components, in accordance with an embodiment of the invention. Referring to FIG. 4, there is shown an envelope 402 and an envelope 404. Envelope 402 represents an output of the subtractor block 230a (env922am−env922pm). Envelope 404 represents an output of the subtractor block 230b (env982am−env982pm). Since the AM and PM components of the single-sided leakage cancel each other, envelope 404 is negligible compared to the large envelope 402, which is due to the DualMono AM sidebands at 922.5 Hz, this allows the mode decision circuit 235 of FIG. 2 to correctly detect the broadcast as dual-mono.

In another embodiment of the invention, the mode decision circuit 235 of FIG. 2 may also be adapted to detect a monaural (mono) broadcast mode. In this regard, block 240 may be adapted to determine whether an AM carrier is present or absent. If the AM carrier is present, the broadcast may be processed to determine whether the broadcast mode is stereo or dual-mono. If the AM carrier is absent, then the broadcast mode is monaural (mono).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for rejecting single sided leakage into an amplitude modulated (AM) channel, the method comprising:
   demodulating a received composite broadcast signal's control channel containing single sided leakage to generate an amplitude modulated (AM) component and a phase modulated (PM) component; and
   subtracting an AM leakage component and a PM leakage component from said AM component and said PM component, said AM leakage component and said PM leakage component contributed by the single sided leakage in the received composite broadcast signal's control channel.

2. The method according to claim 1, comprising AM demodulating said received composite broadcast signal's control channel to generate said AM component.

3. The method according to claim 1, comprising PM demodulating said received composite broadcast signal's control channel to generate said PM component.

4. The method according to claim 1, comprising band pass filtering and detecting envelopes of said AM component at 982.5 Hz and 922.5 Hz.

5. The method according to claim 1, comprising band pass filtering and detecting envelopes of said PM component at 982.5 Hz and 922.5 Hz.

6. The method according to claim 1, comprising locking onto a carrier of the AM channel prior to said demodulating of said received composite broadcast signal's control channel.

7. The method according to claim 1, wherein said demodulated received composite broadcast signal is dual-mono or stereo.

8. The method according to claim 1, comprising band pass filtering said received composite broadcast signal's control channel.

9. The method according to claim 1, comprising determining whether said demodulated received composite broadcast signal is stereo or dual-mono.

10. The method according to claim 1, comprising determining whether said received composite broadcast signal is monaural (mono).

11. A machine-readable storage having stored thereon, a computer program having at least one code section for rejecting single sided leakage into an amplitude modulated channel, the at least one code section being executable by a computer for causing the computer to perform steps comprising:

demodulating a received composite broadcast signal's control channel containing single sided leakage to generate an amplitude modulated (AM) component and a phase modulated (PM) component; and subtracting an AM leakage component and a PM leakage component from said AM component and said PM component, said AM leakage component and said PM leakage component contributed by the single sided leakage in the received composite broadcast signal's control channel.

12. The machine-readable storage according to claim 11, comprising code for AM demodulating said received composite broadcast signal's control channel to generate said AM component.

13. The machine-readable storage according to claim 11, comprising code for PM demodulating said received composite broadcast signal's control channel to generate said PM component.

14. The machine-readable storage according to claim 11, comprising code for band pass filtering and detecting envelopes of said AM component at 982.5 Hz and 922.5 Hz.

15. The machine-readable storage according to claim 11, comprising code for band pass filtering and detecting envelopes of said PM component at 982.5 Hz and 922.5 Hz.

16. The machine-readable storage according to claim 11, comprising code for locking onto a carrier of the AM channel prior to said demodulating of said received composite broadcast signal's control channel.

17. The machine-readable storage according to claim 11, wherein said demodulated received composite broadcast signal is dual-mono or stereo.

18. The machine-readable storage according to claim 11, comprising code for band pass filtering said received composite broadcast signal's control channel.

19. The machine-readable storage according to claim 11, comprising code for determining whether said demodulated received composite broadcast signal is stereo or dual-mono.

20. The machine-readable storage according to claim 11, comprising code for determining whether said received composite broadcast signal is monaural (mono).

21. A system for rejecting single sided leakage into an amplitude modulated channel, the system comprising:

an AM demodulator for demodulating a received composite broadcast signal's control channel containing single sided leakage, to generate an amplitude modulated (AM) component;

a PM demodulator for demodulating said received composite broadcast signal's control channel containing single sided leakage, to generate an phase modulated (PM) component; and at least one circuit that removes an AM leakage component and a PM leakage component from said AM component and said PM component, said AM leakage component and said PM leakage component contributed by the single sided leakage in the received composite broadcast signal's control channel.

22. The system according to claim 21, comprising at least one AM bandpass filter and envelope detector that filters and detects envelopes of said AM component at 982.5 Hz and 922.5 Hz.

23. The system according to claim 21, comprising at least one PM bandpass filter and envelope detector that filters and detects envelopes of said PM component at 982.5 Hz and 922.5 Hz.

24. The system according to claim 21, comprising at least one phase lock loop (PLL) that locks onto a carrier of the AM channel prior to said demodulating of said received composite broadcast signal's control channel.

25. The system according to claim 21, wherein said demodulated received composite broadcast signal is dual-mono or stereo.

26. The system according to claim 21, comprising at least one band pass filter that band pass filters said received composite broadcast signal.

27. The system according to claim 21, comprising a mode decision circuit that determines whether said demodulated received composite broadcast signal is stereo or dual-mono.

28. The system according to claim 21, comprising a mode decision circuit that determines whether said received composite broadcast signal is monaural (mono).

29. The system according to claim 21, wherein said at least one circuit that removes said AM leakage component and said PM leakage component is a subtractor.

\* \* \* \* \*